Figure 1:
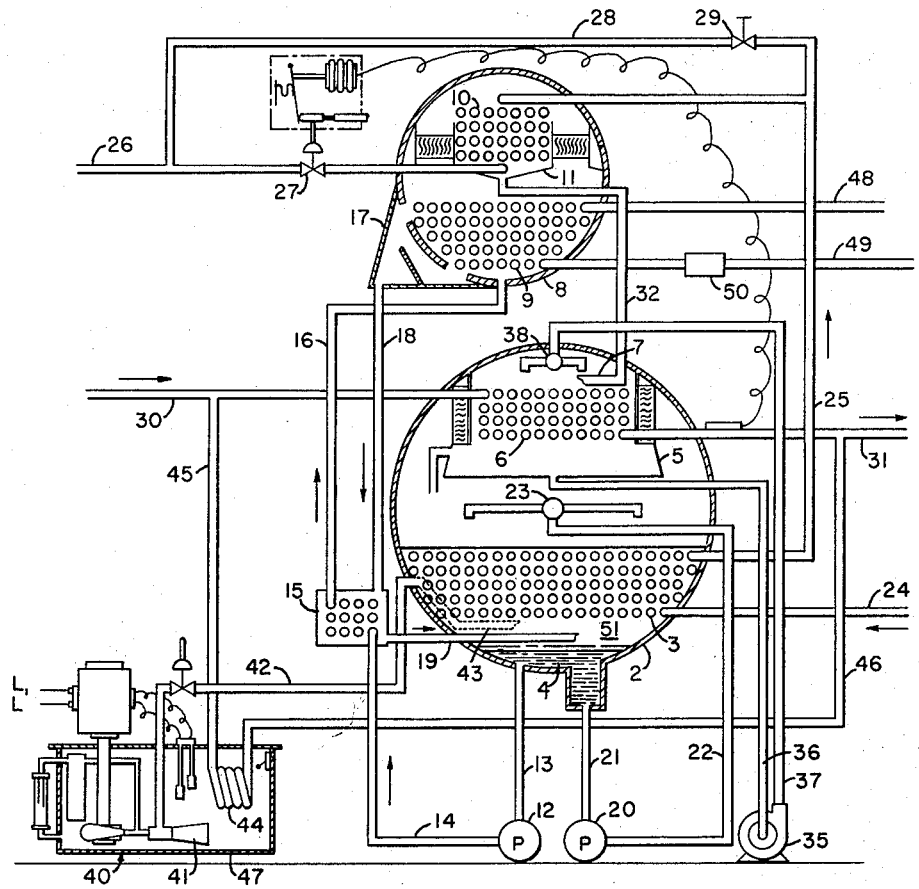

INVENTOR.
LOUIS H. LEONARD, JR.
BY Herman Seid
ATTORNEY

United States Patent Office 2,959,931
Patented Nov. 15, 1960

2,959,931

ABSORPTION REFRIGERATION SYSTEMS AND METHODS OF OPERATING THE SAME

Louis H. Leonard, Jr., East Syracuse, N.Y., assignor to Carrier Corporation, Syracuse, N.Y., a corporation of Delaware Filed Mar. 19, 1958, Ser. No. 722,509

6 Claims. (Cl. 62—101)

This invention relates to an absorption refrigeration system and method of operating the same, and, more particularly to an absorption refrigeration system in which the noise created by operation of the system is greatly reduced and in which the power requirements for circulating solution in the system are reduced over systems of comparable capacity heretofore employed in the industry.

In Berestneff Patent No. 2,565,943 there is disclosed an absorption refrigeration system which has entered into extensive use. This machine includes a pump to supply weak solution from the absorber to the generator and an ejector to supply strong solution from the generator to the absorber. This arrangement, frequently, is noisy in operation due to flashing of refrigerant in the suction and diffuser of the ejector and in the solution line from the ejector to the absorber. It also requires excessive power in operation since it is necessary to employ a pump of sufficient head or capacity to actuate the ejector as well as to supply weak solution to the generator. That is, the entire amount of solution handled by the pump has to be built up to a pressure sufficiently high to operate the ejector, even though approximately 40% of the flow (flow to the generator) need be built up to a pressure only slightly above atmospheric pressure. The additional head need be dissipated before the solution arrives at the generator, which may be done by an orifice plate. In addition, an ejector cannot be designed satisfactorily to compensate for all load conditions. The saturated condition of the solution throughout most of the circuit upon slight disturbance in flow or pressure conditions results in flashing and noise generation. While it is possible to design an ejector which is quiet in operation, it will be appreciated such quiet operation is attained only when the impelling discharge and suction pressures, the impelling flow, the entrained flow and all other operating conditions are at precise design conditions. In actual operations such conditions probably never exist, so that it is necessary to employ an over-capacity ejector to meet all conditions likely to be encountered. Such ejectors are inherently noisy in operation. Hence, while a system satisfactory in operation can be constructed, such system necessarily is noisy in operation to an extent frequently found objectionable.

In Reid Patent No. 2,502,104, there is disclosed an absorption refrigeration system for small capacities in which a pump is provided to supply solution to the generator from the absorber, a by-pass line being provided from the outlet of the pump to sprays in the absorber, to spray solution of the same concentration as forwarded to the generator in the absorber. This is particularly undesirable in systems of large capacities, since it requires continual recirculation of weak solution throughout the absorber. Weak solution, of course, has less absorptive power than strong solution; hence, capacity need be sacrificed to an extent which would not be feasible in systems of large tonnage. During operation, a system of this type tends to operate at higher steam temperatures and at unnecessarily high solution concentrations, thus increasing the possibilities of solution solidification or crystallization.

The chief object of the present invention is to provide an absorption refrigeration system in which these disadvantages of prior systems are obviated.

An object of the present invention is to provide an absorption refrigeration system which is relatively quiet, inexpensive in operating costs and comparatively free of operating difficulties in circulating solution.

A further object is to provide a method of operation of an absorption refrigeration system which permits relatively quiet operation to be obtained and is comparatively free of operating difficulties in the circulation of the solution. Other objects of the invention will be readily perceived from the following description.

This invention relates to an absorption refrigeration system which comprises in combination, a generator, a condenser, a shell containing an evaporator and an absorber, the absorber being placed in the shell below the evaporator to permit vapor to flow downward to be absorbed by solution in the absorber; the absorber including a plurality of closely packed tubes through which cooling medium is passed in heat exchange relation with solution and vapor exteriorly of the tubes and a solution sump placed beneath the tubes; means to supply weak solution from the absorber to the generator; means for supplying strong solution from the generator to the absorber; means in the absorber for discharging the strong solution below the tubes thereby flash cooling the strong solution, the flash cooled strong solution mixing with solution in the sump to form a solution of intermediate concentration, the flashed vapor passing upwardly through the tubes to eliminate any drops of entrained strong solution, the flashed vapor being condensed by its heat exchange relation with cooling medium passing through the tubes and being absorbed by the discharge of solution in the absorber; and means for recirculating the solution of intermediate concentration in the absorber.

This invention further relates to a method of operation of an absorption refrigeration system including a generator, a condenser, an evaporator and an absorber having a plurality of closely packed tubes therein through which cooling medium is passed and a solution sump placed beneath the tubes in which the steps consist in supplying weak solution from the absorber to the generator, supplying strong solution from the generator to the absorber, discharging strong solution in the absorber below the tubes thereby flash cooling the strong solution, adding the flash cooled strong solution to solution in the sump to form a solution of intermediate concentration, passing the flashed vapor upwardly through the closely packed tubes to eliminate any drops of strong solution entrained with the vapor, condensing the flash vapor by placing the same in heat exchange relation with the cooling medium passing through the tubes and absorbing the flashed vapor by discharge of solution in the absorber, and recirculating the solution of intermediate concentration in the absorber.

Figure 2:
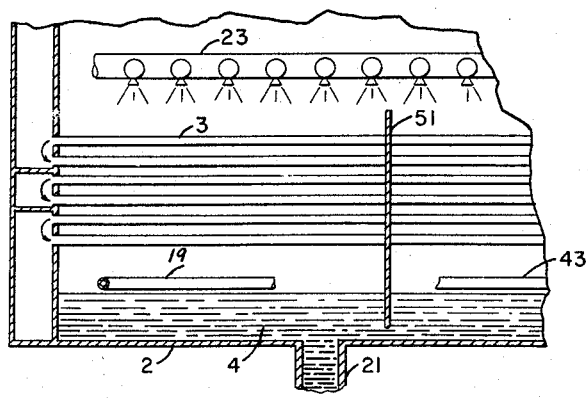

The attached drawings illustrate a preferred embodiment of the invention, in which:

Figure 1 is a diagrammatic view illustrating the absorption refrigeration system of the present invention; and Figure 2 is a fragmentary sectional view taken longitudinally of the absorber shell illustrating the manner in which strong solution is discharged in the absorber.

Referring to the attached drawings, there is shown an absorption refrigeration system which includes a shell 2 containing a plurality of closely packed tubes 3 which cooperate with the shell to form an absorber. An absorber sump 4 is formed at the bottom of the shell 2 below tubes 3.

Placed in shell 2 above absorber 3 is a pan-like member 5, which cooperates with shell 2 to form an evaporator. A plurality of tubes 6 extend longitudinally of the shell above the pan-like member 5. Medium to be cooled passes through these tubes in heat exchange relation with liquid refrigerant sprayed thereover. A vapor condensate return header 7 is placed over tubes 6 and serves to discharge condensate thereover.

A second shell 8, preferably, is placed above the first shell. Tubes 9 extend in the lower portion of the shell 8 and cooperate with shell 8 to form a generator. A plurality of tubes 10 are placed in the upper portion of shell 8 to form a condenser. Tubes 10 cooperate with the pan-like member 11 to form the condenser. Both shells are supported in desired positions on supports (not shown).

A double pump arrangement is provided to circulate solution through the system as hereinafter described. This arrangement includes a pump 12 which withdraws weak solution from absorber 3 through line 13. Pump 12 forwards weak solution through line 14 to heat exchanger 15 in which the weak solution is placed in heat exchange relation with strong solution returning from the generator, as hereinafter described. The weak solution is then forwarded from heat exchanger 15 through line 16 to generator 9. Strong solution flows from generator 9 through overflow arrangement 17, line 18, heat exchanger 15 and line 19 to the absorber, preferably being discharged therein adjacent one end of shell 2 and the outlet to the recirculating pump, as hereinafter described. Strong solution flows through forces of gravity from the generator to the absorber.

It will be understood that upon discharge in absorber 3, the strong solution is flash cooled, the flash cooled solution mixing with solution in the sump 4 to form a solution of intermediate concentration. The flashed vapor so formed flows upwardly through the tubes 3 to eliminate any drops of strong solution entrained therewith; passage through tubes 3 condenses the flashed vapor by placing the same in heat exchange relation with cooling medium passing through the tubes 3 and absorbing the flashed vapor by the discharge of solution of intermediate concentration in the absorber. An important feature of the present invention resides in the use of the tubes 3 as eliminators since by such means any collection of solution in the evaporator is eliminated without disturbing collection of non-condensable gases in the absorber. It will be noted that it is impossible for strong solution to leave the absorber through the outlet of line 13, thus assuring that all the strong solution is employed to form the solution of intermediate concentration and passes through the absorber at least one time before it is possible for such solution to be forwarded to the generator. Distribution of solution in the manner described above prevents solution of intermediate concentration being forwarded to the generator.

Pump 20 is the absorber pump and is employed to withdraw the solution of intermediate concentration from the sump 4 through line 21. Pump 20 forwards the solution of intermediate concentration through line 22 to the spray arrangement 23 of the absorber. Spray 23 serves to distribute the solution of intermediate concentration over the tubes throughout the length of the absorber. The sprayed solution of intermediate concentration absorbs refrigerant vapor and becomes weak solution. A portion of the weak solution so formed collects in sump 4 to be forwarded to generator 6 and the remainder of the weak solution so formed mixes in sump 4 with the flash cooled strong solution to form the intermediate solution. As stated previously, the strong solution upon discharge in the absorber mixes to some extent with weak solution therein and that further mixing and cooling occurs as pump 20 forwards the mixed solution to the spray arrangement 23 so that a solution having a concentration, intermediate the concentration of the strong and weak solution, is forwarded to the absorber.

Condensing water is forwarded by a pump (not shown) through line 24 to the tubes 3 of the absorber. The condensing water passes from the tubes 3 of the absorber through line 25 to the tubes 10 of the condenser. Condensing water leaves the tubes 10 of the condenser through line 26.

A modulating valve 27 is placed in line 26 to regulate flow of condensing water through the condenser. Valve 27 is actuated in response to the temperature of chilled medium leaving the evaporator. A suitable control system is disclosed and claimed in my Patent No. 2,722,805, granted November 8, 1955. Under some circumstances, if desired, a by-pass line 28 may be provided about the condenser, manual valve 29 being placed in line 28. Line 28 permits an initial adjustment of the flow of condensing water through the condenser, so that the proper condensing medium is maintained for full load operation.

Medium to be cooled is forwarded by a pump (not shown) through line 30 to the tubes 6 of evaporator 5. The cooled medium leaves the tubes 6 through line 31 and is forwarded to a place of use such as the central station of an air conditioning system. The medium after passing through the central station returns to the evaporator 5 through line 30 to be again cooled and reused.

Condensate leaves condenser 10 through line 32 and is returned to header 7 in the evaporator and discharged in the evaporator over the tubes 6 to wet the tubes. It will be appreciated the refrigerant is flashed to cool the same upon its discharge in the evaporator and is vaporized by its heat exchange relation with the medium passing through the tubes of the evaporator. The flashed vapor passes to absorber 3 to be absorbed by the solution therein.

Pump 35 serves to recirculate liquid refrigerant collected in the evaporator. Pump 35 is connected to the evaporator by line 36 to withdraw liquid refrigerant therefrom. Pump 35 forwards the liquid refrigerant through line 37 to spray arrangement 38 of the evaporator, the liquid refrigerant flash cooling upon discharge in the evaporator, remaining liquid refrigerant wetting the tubes to cool medium passing through the tubes. The heat exchange relation between medium passing through the tubes and the liquid refrigerant on the exterior of the tubes cools the medium and evaporates the liquid refrigerant. The vapor passes to the absorber as previously described.

A suitable purge arrangement indicated generally at 40 is provided to remove non-condensable gases from the absorber. The ejector 41 of purge arrangement 40 is connected by line 42 to a purge line 43 which extends longitudinally of the absorber to about the central portion thereof, thus permitting non-condensable gases to be removed from the absorber. The cooling coil 44 of purge arrangement 40 is connected to line 30 by line 45 and to line 31 by line 46, permitting medium to be employed for cooling solution in the purge tank 37. The purge arrangement 40 is disclosed and claimed in copending application, Serial No. 565,324, filed February 14, 1956, in the name of Louis H. Leonard, Jr., and reference is made to such application for a more complete description of the purging arrangement.

Steam is supplied to the generator 9 through line 48 and is condensed in the tubes of the generator in heat exchange relation with solution in the generator, the condensate leaving the generator through line 49, a steam trap 50 being placed in line 49.

The preferred absorbing solution is a solution of lithium bromide and water. The preferred refrigerant is water. Preferably, the solution concentration leaving the generator is about 66%. As stated above, a greater concentration may permit crystallization to occur, causing solidification in the heat exchanger and perhaps in other portions of the system.

The term "weak solution" is used herein to describe a solution weak in absorbing power. The term "strong solution" is used herein to define a solution strong in absorbing power.

It is essential that both pumps 12 and 20 possess adequate suction level. Inadequate suction level to pump 12 or pump 20 would create flashing and consequent noise in line 13 or line 21. It would also make the pump inoperative. Adequate suction level is first established by providing in the system a sufficient quantity of absorbent to fill generator 9 and absorber 3 to the required level. Pump 20, the absorber pump, discharges its entire flow to spray arrangement 23. The discharge of spray arrangement 23 drains to the bottom of the absorber to sump 4; hence, the quantity of solution contained in the absorber cannot change because of the operation of pump 20.

Pump 12, the generator pump, discharges its entire flow to generator 9. Generator 9 maintains a constant level because of overflow arrangement 17. A quantity of strong solution from generator 9 substantially equal to the discharge of pump 12 (that is, the discharge of pump 12 minus the vapor boiled off in the generator) is continuously draining by forces of gravity to the absorber with substantially the same quantity of solution being supplied to the absorber and generator as pumps 12 and 20 discharge to the absorber and to the generator. The absorbent level in the absorber will not change substantially and adequate suction level is maintained. As a result, the noise level of this system is extremely low.

The quantity of solution which is removed from the absorber by pump 12 equals the quantity of solution supplied to the absorber by line 19. The flow quantity relationship between pump 12 and pump 20 can therefore be established at any desired proportion without affecting the suction level to either pump. The flow quantity of pump 20 is comprised of a quantity of strong solution equal to the discharge flow of pump 12, minus the vapor boiled off or flashed, plus a quantity of weak solution drained from the absorber.

Preferably, a vapor barrier 51 is placed in the absorber and extends between the outlet of line 19 and the inlet of the purge line 43. This barrier 51 extends below the lowest operating solution level in the absorber so that no vapor flashed upon the discharge of strong solution in the absorber can pass directly to the purge inlet, but such vapor is forced to flow upward through the closely packed tubes 3, thus assuring that collection of non-condensable gases below and centrally of the tube bundle is not disturbed or effected. Barrier 51 extends at least to the upper row of tubes 3 in the absorber; thus barrier 51 assures that the closely packed tubes 3 serve in effect as eliminators to remove entrained drops of strong solution carried with the flashed vapor.

Considering the operation of the system, pump 12 draws weak solution from sump 4 and forwards the weak solution through line 14 to heat exchanger 15, where it is placed in heat exchange relation with strong solution returning to the absorber. Weak solution then passes through line 16 to the generator. In the generator, refrigerant is boiled from this solution, the refrigerant passing to tubes 10 of the condenser and being condensed thereon. Strong solution leaves the generator through overflow arrangement 17 and is returned, by forces of gravity and the pressure differences existing between the generator and the absorber, through line 18, heat exchanger 15 and line 19 to the absorber; discharge of strong solution in the absorber above the level of liquid in the sump and below the closely packed tubes, flash cools the solution, flash cooled solution falling to the sump 4 and mixing with weak solution therein, while the flashed vapor flows upwardly through the closely packed tubes 3 thus eliminating any drops of strong solution entrained with the vapor and condensing the flashed vapor by placing the same in heat exchange relation with cooling medium passing through the tubes 3 and absorbing the flashed vapor by the discharge of solution of intermediate concentration in the absorber. Since non-condensable gases in the condenser may be entrained by the strong solution returning to the absorber, the manner of discharge of strong solution in the absorber aids in separation of such gases from vapor and assures their flow in a regular path upward and downward through the tubes to the removal point without disturbing the collection of such gases at the removal point. The strong solution, due to the manner in which it is returned to one end of the absorber and discharged below the closely packed tubes 3 adjacent the outlet to recirculation pump 20, mixes with solution in the sump 4 to form solution of intermediate concentration; the manner in which the strong solution is discharged in the absorber assures that only weak solution is forwarded to the generator.

Pump 20 draws solution from sump 4, pump 20 serving to further mix the solutions and to form a solution of intermediate concentration which it returns to the spray arrangement 23 of the absorber. The solution of intermediate concentration is sprayed over the tubes of the absorber and absorbs the refrigerant vapor passing to the absorber from evaporator 6, as well as the flashed vapor arising through the tubes due to the manner in which strong solution is discharged in the absorber, thus forming weak solution, a portion of which is collected in the sump, as previously described. Some portion of the weak solution, of course, mixes with the flash cooled strong solution discharged in the absorber to form the solution of intermediate concentration.

The arrangement provided assures that only weak solution is forwarded to the generator by pump 12. Solution level in the absorber is maintained by means of gravity thus eliminating any problem involved in the maintenance of sufficient head on the pumps to prevent the pumps running dry and permitting the system to be operated without flashing of absorbent throughout the solution lines thus eliminating noises created by flashing.

Due to the manner in which strong solution is discharged in the absorber any possibility of drops of strong solution being carried to the evaporator by flashed vapor flowing upward in shell 2 is eliminated since any entrained drops are removed from the upwardly flowing vapor by the closely packed tubes 3, which in effect, serve as eliminators.

The method of operation provided by the present invention permits more efficient operation to be achieved and assures that no strong solution reaches the evaporator in spite of the violent flashing which occurs in the absorber.

Increased flexibility of operation of an absorption refrigeration system is provided since the pump circuits are not highly susceptible to irregularities in solution flow. Pump motor speeds may be reduced because of greatly decreased head requirements resulting in quieter operation of the solution pumps and motor. Since the pumps are operated at low speeds longer seal life results.

The present invention provides an absorption refrigeration system in which the pressure differential used to circulate the solution for any desired size of machine may be selected to permit smaller pipe sizes and a reduction in the number of spray nozzles which result in saving in initial cost of this system.

While I have described a preferred embodiment of the invention, it will be understood that the invention is not limited thereto since it may be otherwise embodied in the scope of the following claims.

I claim:

1. In an absorption refrigeration system, the combination of a generator, a condenser, a shell containing an evaporator and an absorber, the absorber being placed in the shell below the evaporator to permit vapor to flow downward to be absorbed by solution in the absorber, the absorber including a plurality of closely packed tubes through which cooling medium is passed in heat exchange relation with solution and vapor exteriorly of the tubes and a solution sump placed beneath the tubes; means to supply weak solution from the absorber to the generator; means for supplying strong solution from the generator to the absorber; means in the absorber immediately below the tubes for discharging the strong solution immediately below the tubes therein and above the liquid level in the sump of the absorber thereby flash cooling the strong solution, the flash cooled strong solution mixing with solution in the sump of the absorber to form a solution of intermediate concentration, the flashed vapor passing upwardly through the tubes which serve as eliminators to eliminate any drops of entrained strong solution, the vapor being condensed by its heat exchange relation with cooling medium passing through the tubes and being absorbed by the discharge of solution in the absorber; and means for recirculating the solution of intermediate concentration in the absorber.

2. In an absorption refrigeration system, the combination of a generator, a condenser, a shell containing an evaporator and an absorber, the absorber being placed in the shell below the evaporator to permit vapor to flow downward to be absorbed by solution in the absorber, the absorber including a plurality of closely packed tubes through which cooling medium is passed in heat exchange relation with solution and vapor exteriorly of the tubes and a solution sump placed beneath the tubes; a first pump to supply weak solution from the absorber to the generator a purge line extending in the absorber having an inlet therein; means for supplying strong solution from the generator to the absorber; means in the absorber immediately below the tubes for discharging the strong solution immediately below the tubes and above the level of liquid in the sump of the absorber, thereby flash cooling the strong solution, the flash cooled strong solution mixing with solution in the sump of the absorber to form a solution of intermediate concentration, the flashed vapor passing upwardly through the tubes which serve as eliminators to eliminate any drops of entrained strong solution, the vapor being condensed by its heat exchange relation with cooling medium passing through the tubes and being absorbed by the discharge of solution in the absorber, a vapor barrier placed between the purge line inlet and the strong solution discharge means; and a second pump for recirculating the solution of intermediate concentration in the absorber.

3. An absorption refrigeration system according to claim 1 in which the strong solution is discharged adjacent one end of the absorber and the outlet for solution of intermediate concentration.

4. An absorption refrigeration system according to claim 1 in which a purge line extends in the absorber and a vapor barrier is interposed between the purge line and the strong solution discharge means.

5. An absorption refrigeration system according to claim 4 in which the strong solution is discharged adjacent one end of the absorber and the outlet for solution of intermediate concentration.

6. In a method of operation of an absorption refrigeration system including a generator, a condenser, an evaporator and an absorber having a plurality of closely packed tubes therein through which cooling medium is passed and a solution sump placed beneath the tubes, the steps which consist in supplying weak solution from the absorber to the generator, supplying strong solution from the generator to the absorber discharging strong solution in the absorber immediately below the tubes and above the level of liquid refrigerant in the sump of the absorber thereby flash cooling the strong solution, adding the flash cooled strong solution to solution in the sump to form a solution of intermediate concentration, passing the flashed vapor upwardly through the closely packed tubes to eliminate any drops of strong solution entrained with the vapor, condensing the flashed vapor by placing the same in heat exchange relation with cooling medium passing through the tubes and absorbing the flashed vapor by the discharge of solution in the absorber, withdrawing a solution of intermediate concentration from the absorber sump, and discharging the withdrawn solution of intermediate concentration in the absorber over the closely packed tubes therein.

References Cited in the file of this patent

UNITED STATES PATENTS

| | | |
|---|---|---|
| 2,494,972 | Thomas | Jan. 17, 1950 |
| 2,840,997 | Leonard | July 1, 1958 |
| 2,847,832 | Johnson | Aug. 19, 1958 |